BEST AVAILABLE COPY

United States Patent [19]
Aron et al.

[11] Patent Number: 4,693,065
[45] Date of Patent: Sep. 15, 1987

[54] FARM MACHINES HAVING FLEXIBLE SKIRTS FOR MOVING AGRICULTURAL PRODUCTS ON THE GROUND

[75] Inventors: Jerome Aron, Bouxwiller; Alfred Engel, Saverne, both of France

[73] Assignee: Kuhn S.A., Cedex, France

[21] Appl. No.: 826,815

[22] Filed: Feb. 6, 1986

[30] Foreign Application Priority Data

Feb. 6, 1985 [FR] France ............... 85 01747

[51] Int. Cl.⁴ .................. A01D 80/00; A01D 84/00
[52] U.S. Cl. ........................... 56/377; 56/DIG. 21
[58] Field of Search ........... 56/377, 370, 365, DIG. 21

[56] References Cited
U.S. PATENT DOCUMENTS

| 3,050,340 | 8/1962 | Lyon | 301/37 TC |
| 4,203,277 | 5/1980 | Kaetzel | 56/377 |
| 4,397,135 | 8/1983 | Wattron | 56/377 |
| 4,519,194 | 5/1985 | Aron | 56/370 |
| 4,610,130 | 9/1986 | Müller | 56/365 |

FOREIGN PATENT DOCUMENTS

| 630524 | 11/1961 | Canada | 301/37 TC |
| 2066034 | 7/1981 | United Kingdom | 56/370 |

Primary Examiner—Richard J. Johnson
Attorney, Agent, or Firm—Oblon, Fisher, Spivak, McClelland & Maier

[57] ABSTRACT

A farm machine includes a frame, at least one rotor mounted on the frame, and a tapered flexible skirt for moving products that are on the ground mounted on the rotor. The tapered flexible skirt has close to its outer edge a zone the thickness of which is greater than the thickness of the remaining part of the tapered flexible skirt. The zone is an integral part of the tapered flexible skirt and extends without interruption over the entire periphery of the tapered flexible skirt.

10 Claims, 3 Drawing Figures

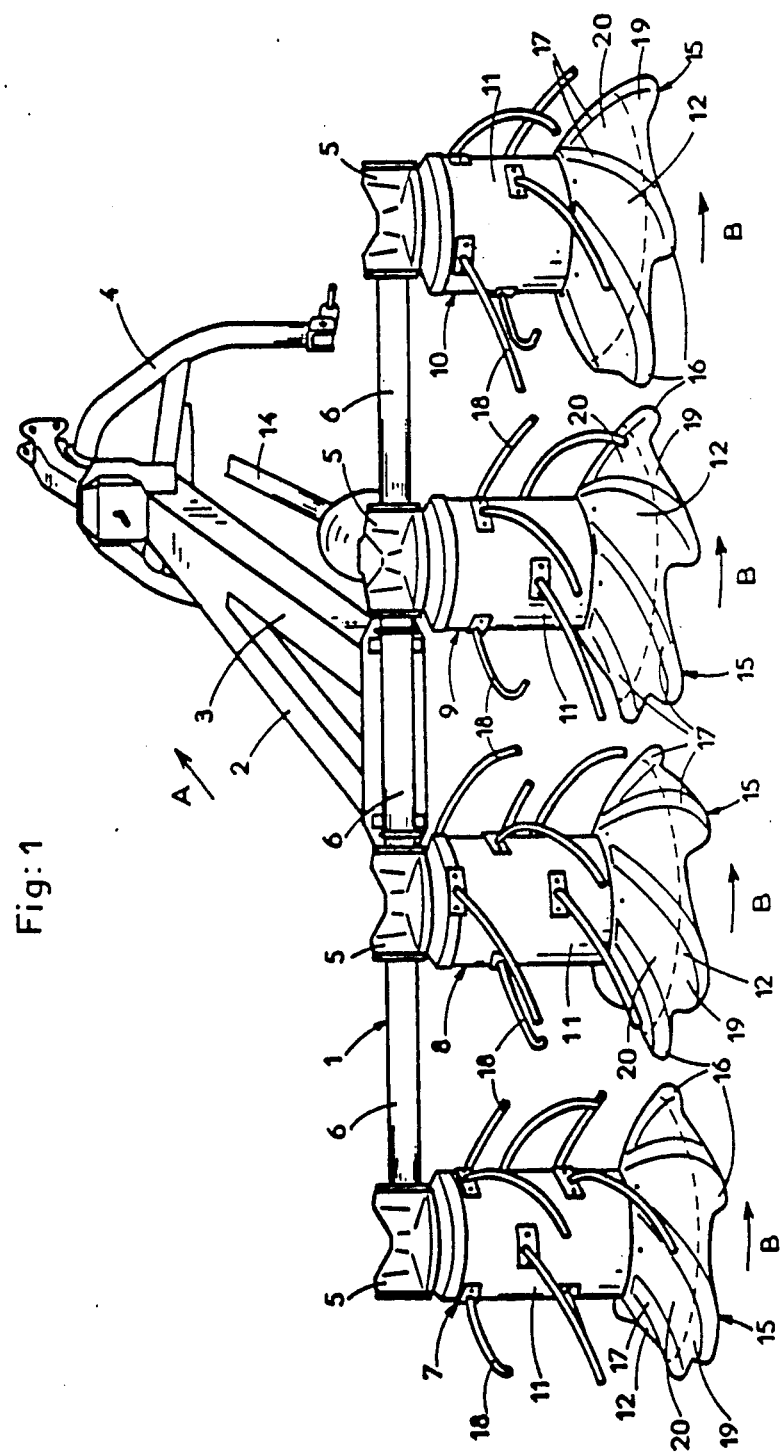

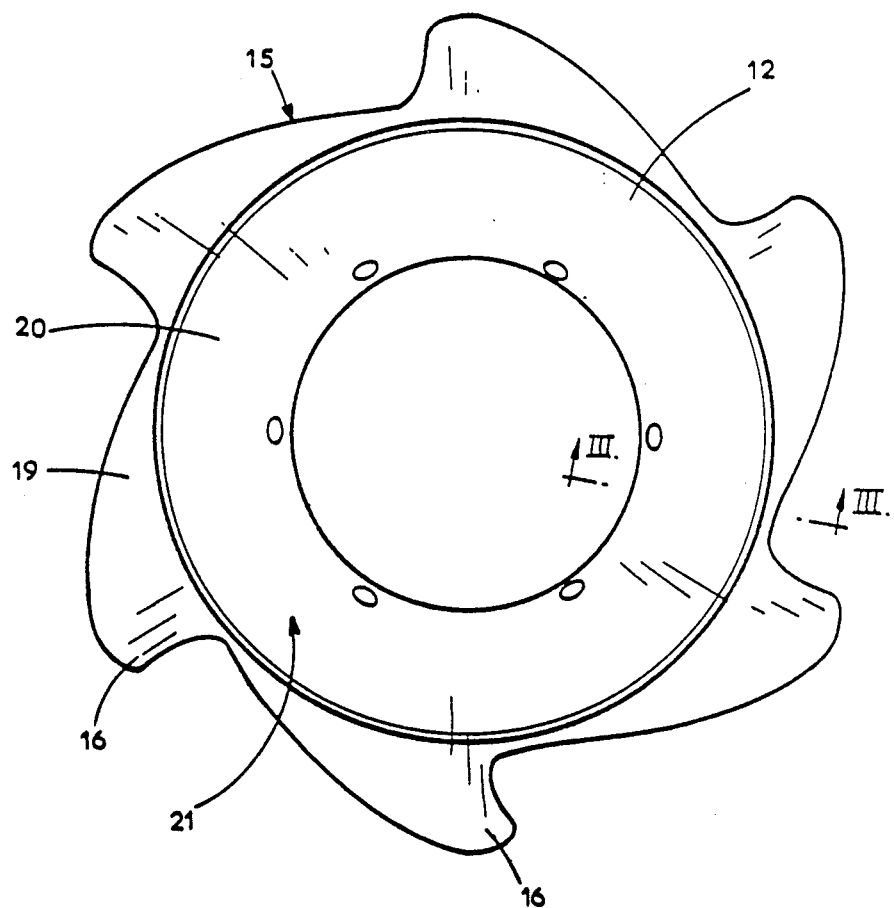
Fig: 2

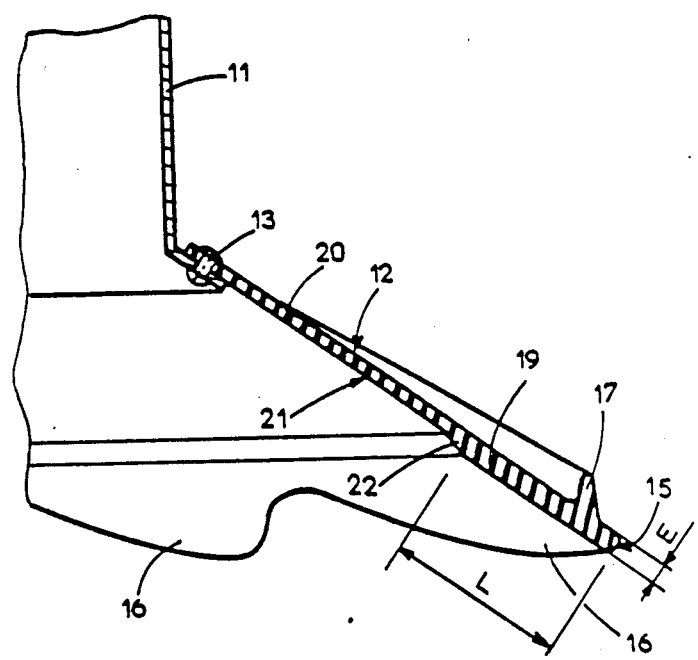
Fig: 3

FARM MACHINES HAVING FLEXIBLE SKIRTS FOR MOVING AGRICULTURAL PRODUCTS ON THE GROUND

FIELD OF THE INVENTION

This invention relates to farm machines having a frame carrying at least one rotor driven in rotation during work. The rotor is equipped with a tapered flexible skirt that moves agricultural products that are on the ground.

BACKGROUND OF THE INVENTION

On known machines of this type, the skirts are deformed by centrifugal force during work. They then have a tendency to be pulled away from the ground, which brings about a poor gathering of the products to be moved and causes losses. Moreover, the outside part of the skirts wears rather quickly and even tears because of rubbing on the ground and as a result of encounters with obstacles such as stones or stumps on the ground. Because of these defects, the quality of the work obtained with these skirts is obviously reduced, especially with regard to the neatness of the gathering. Because of this, the user can be led rather quickly to change the skirts.

OBJECT OF THE INVENTION

This invention has as its principal object the improvement of the flexible skirts equipping such farm machines to eliminate or ameliorate the foregoing drawbacks.

CHARACTERISTICS OF THE INVENTION

An important characteristic of the invention consists in providing, close to the outside edge of each flexible skirt, a zone in which the thickness of the skirt is greater than in its remaining inside part. The thickened zone constitutes an integral part of the skirt and extends without interruption over the entire periphery of the skirt.

The thickened zone acts like a belt, and it thereby improves the resistance of the flexible skirt to deformation due to the effects of centrifugal force. The skirts remain constantly in contact with the ground, which makes it possible to obtain a gathering of good quality. In addition, this increase in thickness improves the resistance to the rubbing and/or the impacts caused by the ground and the various obstacles that the skirts encounter during work. Thus, the service life of the skirts is considerably lengthened.

The fact that the thickened zone constitutes an integral part of the skirt makes it possible to eliminate or ameliorate in an inexpensive way the drawbacks of the known machines. The thickened zone can be obtained directly during making of the skirt. There is, therefore, no need to add stiffening or protective means which would require special equipment to fasten them to the skirt. Furthermore, these added means could come loose from the skirt after a period of use, which would cause a reduction in the quality of the work. On the other hand, the fact that the thickened zone is an integral part of the skirt rules out this risk and provides a constant quality work during the entire service life of the skirt.

According to another characteristic of the invention, the width of the zone in which the thickness of the skirt is greater is less than half the total width of the skirt. This preserves a flexibility in the skirt sufficient to be able to follow completely the irregularities of the ground.

The width of the thickened zone can advantageously correspond to the width of the part of each skirt which is in contact with the ground during work. In this case, the part of the skirt which has a lesser thickness does not rub on the ground and therefore is not subjected to extensive wear.

Preferably, the thickened zone extends downwardly beyond the remaining part of the skirt on the side of the thinner zone that is directed toward the ground. The connection of the lower faces of the thickened zone and the remaining part of the skirt is provided by an inclined part to limit the possibilities of catching on earth or debris.

Other characteristics and advantages of the invention will become apparent from the description given below, with reference to the accompanying drawings which represent, by way of a nonlimiting example, a haymaking machine according to the invention.

BRIEF DESCRIPTION OF THE DRAWINGS

FIG. 1 is an overall view of a haymaking machine according to the invention.

FIG. 2 is a bottom view on a larger scale of a skirt according to the invention.

FIG. 3 is a section of a skirt and of a part of a rotor on line III-13 III in FIG. 2.

DETAILED DESCRIPTION OF THE PRESENTLY PREFERRED EMBODIMENT

As shown in FIG. 1, the haymaking machine according to the invention comprises a frame 1 to which two beams 2 and 3 arranged in the shape of a V are connected. A three-point coupling support 4 is connected to the front ends of the beams 2 and 3. The three-point coupling support 4 makes it possible to couple the machine to a tractor (not shown), which, in turn, makes it possible to move the haymaking machine in the direction of arrow A during work.

The frame 1 consists of four casings 5 connected to one another by pipes 6. The frame 1 is equipped with four rotors 7, 8, 9 and 10 mounted to rotate freely on supports in the form of shafts (not shown). The upper end of each of the supports is connected to the frame 1, while the lower end of each of the supports is equipped with a ground support element such as a wheel, a skid, or a roller (not shown). Obviously, the number of rotors can vary without going outside the scope of the invention.

Each of the rotors 7 to 10 is composed of a rigid wall 11 which forms a cylinder and a skirt 12 that is tapered and flexible. The skirts 12 are fastened to the lower parts of the rigid walls 11. The rigid walls 11 can be made of sheet metal or of rigid plastic, while the skirts 12 can be made of rubber, flexible plastic, or another similar material. As shown in FIG. 3, the skirts 12 are fastened to the rigid walls 11 by rivets 13.

In the position shown in FIG. 1, the frame 1 is arranged obliquely in relation to the direction of advance A. This arrangement facilitates the transmission of the products to be moved from each rotor to the next successive rotor to make a windrow on the side of the rotor 7 located at the rearmost end of the machine. During this windrowing work, the four rotors 7 to 10 are driven in rotation in the same direction (i.e., the direction indicated by the arrow B). The rotors 7 to 10 can be approximately vertical or they can be slightly inclined forward, in the direction of advance A of the machine.

The driving of the rotors 7 to 10 in rotation is provided, in a way known in the art, by a shaft housed in the frame 1. For this purpose, the frame 1 comprises in each casing 5 a bevel pinion which engages an annular gear mounted on the corresponding rotor 7 to 10. The shaft is driven, in a way known in the art, from the power take-off shaft of the tractor by a Cardan shaft 14.

During work, the skirts 12 dip under the products (for example, hay spread over the ground), follow completely all the irregularities of the ground, and move the products over their upper faces. The outside edge 15 of each skirt 12 has protuberances 16 that facilitate the grasping of the products. This grasping is also facilitated by the forward inclination of the rotors 7 to 10. This inclination makes it possible to have a better contact of the skirts 12 with the ground in the forward part of their paths. In addition, the upper face of each skirt 12 is equipped with ribs 17 to facilitate the driving of the products.

During the windrowing of the hay, it is gathered by the skirts 12. The hay is then transmitted from one rotor to another and is deposited laterally to the machine in the form of a windrow. Transmission is improved with drivers 18 fastened to the rigid walls 11 of the rotors 7 to 10. The drivers 18 also prevent the passage of hay between the various rotors 7 to 10.

According to an important characteristic of the invention, each flexible skirt 12 comprises close to its outside edge 15 a zone 19 in which its thickness is greater than in its remaining inside part 20. The zone 19 constitutes an integral part of the flexible skirt 12 and extends without interruption over the entire periphery of the skirt 12 (see FIGS. 2 and 3). This makes it possible to limit the deformations of the skirt 12 under the action of the centrifugal force resulting from its rotation. Moreover, the zone 19 reinforces the skirt 12 and virtually eliminates the risk of tearing of the skirt 12 between the protuberances 16.

As shown in FIG. 3, the thickness E of the skirt 12 in the zone 19 is approximately double its thickness in the inside part 20. The thickness E is advantageously between 5 and 15 millimeters.

The zone 19 can be obtained during the making of the skirt 12. For this purpose, it is enough to provide an indentation corresponding to the shape of the zone 19 in the mold which is used to make the skirt 12.

The width L of the zone 19 is less than half the total width of the skirt 12. This design preserves a good flexibility, permitting the skirt 12 to follow the irregularities of the ground. Good results have been obtained with skirts 12 having zones 19 with a width L between one-fifth and two-fifths of their total width.

The zone 19 advantageously constitutes the part of the skirt 12 which is in contact with the ground during work. For this purpose, it extends to the outside edge 15 of the skirt 12. Thus, only the zone 19 is subjected to rubbing on the ground and to impacts. The skirt 12 according to this invention therefore has a service life substantially greater than that of presently known skirts.

As is particularly evident from FIG. 3, the zone 19 projects downwardly from the inside part 20 of the skirt 12 on the lower side 21 of the skirt 12. This characteristic makes it possible to protect the side of the skirt 12 which is directed toward the ground. In addition, its upper face remains disengaged, which facilitates the sliding of the hay.

The connection of the lower face of the zone 19 with the lower face of the inside part 20 of the skirt 12 is made by an inclined part 22 (shown in FIG. 3). Thus, the bottom of the skirt 12 does not have a sharp edge on which earth or hay debris could be caught.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A farm machine comprising:
   (a) a frame;
   (b) at least one rotor mounted on said frame; and
   (c) a resilient flexible skirt at least generally in the shape of a hollow truncated cone for moving products that are on the ground mounted on said at least one rotor, said flexible skirt comprising a first zone and a second zone, said first zone:
      (i) having a thickness which is greater than the thickness of said second zone;
      (ii) being integrally formed as a part of said flexible skirt;
      (iii) extending without interruption over the entire periphery of said flexible skirt;
      (iv) extending to the outside edge of said flexible skirt; and
      (v) projecting downwardly beyond said second zone on the lower side of said flexible skirt.

2. A machine as recited in claim 1 wherein the thickness of said flexible skirt in said first zone is at least approximately double the thickness of said second zone.

3. A machine as recited in claim 1 wherein the width of said first zone is less than half the total width of said flexible skirt.

4. A machine as recited in claim 1 wherein said first zone is the part of said flexible skirt that is in contact with the ground during work.

5. A machine as recited in claim 5 wherein said first zone is connected to said second zone by an inclined part.

6. A resilient flexible skirt for farm machines, said flexible skirt being designed to move products that are on the ground, said flexible skirt comprising ribs extending upwardly from the surface and having a scalloped periphery, said skirt including a first zone and a second zone, said first zone:
   (a) having a thickness which is greater than the thickness of said second zone;
   (b) being integrally formed as a part of said flexible skirt;
   (c) extending without interruption over the entire periphery of said flexible skirt;
   (d) extending to the outside edge of said flexible skirt; and
   (e) projecting downwardly beyond said second zone on the lower side of said flexible skirt.

7. A skirt as recited in claim 6 wherein the thickness of said first zone is at least approximately double the thickness of said second zone.

8. A skirt as recited in claim 6 wherein the width of said first zone is less than half the total width of said flexible skirt.

9. A skirt as recited in claim 6 wherein said first zone is the part of said flexible skirt that is in contact with the ground during work.

10. A skirt as recited in claim 6 wherein said first zone is connected to said second zone by an inclined part.

* * * * *